United States Patent
Song et al.

(10) Patent No.: US 11,388,110 B2
(45) Date of Patent: Jul. 12, 2022

(54) CENTRALIZED SCHEDULING APPARATUS AND METHOD CONSIDERING NON-UNIFORM TRAFFIC

(71) Applicant: ELECTRONICS AND TELECOMMUNICATIONS RESEARCH INSTITUTE, Daejeon (KR)

(72) Inventors: Jongtae Song, Daejeon (KR); YongWook Ra, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 251 days.

(21) Appl. No.: 16/885,008

(22) Filed: May 27, 2020

(65) Prior Publication Data

US 2021/0152493 A1 May 20, 2021

(30) Foreign Application Priority Data

Nov. 20, 2019 (KR) .................. 10-2019-0149423

(51) Int. Cl.
| | |
|---|---|
| *H04L 49/25* | (2022.01) |
| *H04L 49/101* | (2022.01) |
| *H04L 49/00* | (2022.01) |
| *H04L 47/50* | (2022.01) |
| *H04L 49/253* | (2022.01) |
| *H04L 12/70* | (2013.01) |

(52) U.S. Cl.
CPC ............ *H04L 49/254* (2013.01); *H04L 47/50* (2013.01); *H04L 49/101* (2013.01); *H04L 49/3045* (2013.01); *H04L 2012/5679* (2013.01)

(58) Field of Classification Search
CPC . H04L 49/254; H04L 49/101; H04L 49/3045; H04L 47/50; H04L 2012/5679
See application file for complete search history.

(56) References Cited

U.S. PATENT DOCUMENTS

| | | | |
|---|---|---|---|
| 8,705,368 B1 * | 4/2014 | Abts | ..................... H04L 49/109 370/461 |
| 2002/0176431 A1 | 11/2002 | Golla et al. | |
| 2003/0227926 A1 * | 12/2003 | Ramamurthy | ...... H04L 12/5601 370/395.42 |
| 2005/0152352 A1 * | 7/2005 | Jun | ........................ H04L 47/50 370/388 |
| 2007/0133585 A1 | 6/2007 | Minkenberg et al. | |

(Continued)

FOREIGN PATENT DOCUMENTS

| | | |
|---|---|---|
| JP | 2017538376 A | 12/2017 |
| KR | 1020180103619 A | 9/2018 |

OTHER PUBLICATIONS

Yongwook Ra et al., "Experimental Demonstration of a Photonic Frame Based Packet Switched Optical Network for Data Centers", Journal of Latex Class Files, vol. 14, No. 8, pp. 1-12, Aug. 2015.

*Primary Examiner* — Kent Krueger
(74) *Attorney, Agent, or Firm* — Rabin & Berdo, P.C.

(57) ABSTRACT

The present disclosure relates to a centralized scheduling method and apparatus that considers non-uniform traffic and, more particularly, to a centralized scheduling method and apparatus for performing effective scheduling based on a characteristic of non-uniform traffic in consideration of a traffic distribution in a data center network.

16 Claims, 11 Drawing Sheets

(56) References Cited

U.S. PATENT DOCUMENTS

| | | |
|---|---|---|
| 2010/0260198 A1 | 10/2010 | Rojas-Cessa et al. |
| 2014/0064269 A1* | 3/2014 | Hamdi ................... H04L 49/25 370/355 |
| 2016/0344641 A1 | 11/2016 | Javidi et al. |
| 2017/0149936 A1 | 5/2017 | Moon et al. |
| 2018/0262437 A1 | 9/2018 | Han et al. |

* cited by examiner

Select a column vector $V_{RRP}(s)$

Eq.-3): $M^i_{p \to q} = \begin{cases} 0 & \text{if } VOQ_{p \to q} \text{ is empty} \\ 1 & \text{otherwise.} \end{cases}$ : VOQ status in input $p \to$ output $q$ (for $i$-th iteration)

$M^i = $

| Q\P | 0 | 1 | 2 | 3 |
|---|---|---|---|---|
| 0 | 0 | 1 | 1 | 1 |
| 1 | 1 | 1 | 0 | 0 |
| 2 | 1 | 1 | 1 | 0 |
| 3 | 0 | 0 | 1 | 1 |

Current VOQ status

Finding the $M_{TR}$ matrix for the first iteration from the input RRP matrix (Off-line) and the current VOQ state matrix (On-line).

$V_{RRP}(0) = \begin{bmatrix} 0 \\ 3 \\ 2 \\ 1 \end{bmatrix}$  $V^T_{RRP}(s) = [v_1, v_2, ..., v_N]$ : Eq.-4)

$V^T_{RRP}(0) = [0, 3, 2, 1]$ $R_{RRP}(p,s) = $

| S\P | 0 | 1 | 2 | 3 |
|---|---|---|---|---|
| 0 | 0 | 3 | 2 | 1 |
| 1 | 3 | 0 | 1 | 2 |
| 2 | 2 | 1 | 0 | 3 |
| 3 | 1 | 2 | 3 | 0 |

$V_{RRP}(0)$ Column Vector
Input RRP matrix $M_{RRP} = \sum_{n=1}^{N} V_n V^T_{v_n+1}$ : Eq.-5)

$\mathbb{N}_s = \{p | \sum_q M^i_{p \to q} \neq 0\}$  $|\mathbb{N}_s| = 4$ : Eq.-7)

$s$ : Sequence step,
$V_n$ : a column vector consisting of zeros except for $n$-th element which is one.

$V_1 = \begin{bmatrix} 1 \\ 0 \\ 0 \\ 0 \end{bmatrix}$ $V_2 = \begin{bmatrix} 0 \\ 1 \\ 0 \\ 0 \end{bmatrix}$ $V_3 = \begin{bmatrix} 0 \\ 0 \\ 1 \\ 0 \end{bmatrix}$ $V_4 = \begin{bmatrix} 0 \\ 0 \\ 0 \\ 1 \end{bmatrix}$ $V^T_1 = [1,0,0,0]$  $V^T_4 = [0,0,0,1]$
$V^T_3 = [0,0,1,0]$  $V^T_2 = [0,1,0,0]$ $M_{RRP} = \sum_{n=1}^{N} V_n V^T_{v_n+1}$ : Eq.-5)

$M_{RRP} = \begin{bmatrix} 1 & 0 & 0 & 0 \\ 0 & 0 & 0 & 1 \\ 0 & 0 & 1 & 0 \\ 0 & 1 & 0 & 0 \end{bmatrix}$ $M_{TR} := M^1 \wedge M_{RRP}$ : Eq.-6)

$M_{TR}(n,m) = \begin{bmatrix} 0 & 0 & 0 & 0 \\ 0 & 0 & 0 & 0 \\ 0 & 0 & 1 & 0 \\ 0 & 0 & 0 & 0 \end{bmatrix}$ Check whether sum of all elements of $M_{TR}$ is equal to $|\mathbb{N}_s|$ or not.

Since $|\mathbb{N}_s| = 1$, shift to find the next VOQ.

$M_{TR}(n,m) = \begin{bmatrix} 0 & 0 & 0 & 0 \\ 0 & 0 & 0 & 0 \\ 0 & 0 & 1 & 0 \\ 0 & 0 & 0 & 0 \end{bmatrix}$ = 0, shift O; = 0, shift O; = 1, shift X; = 0, shift O Eq.-8):  $\sum_m M_{TR,n,m} = 0$ $v_n \to v'_n := (v_n + 1) \mod N$ for $n \in N$ Obtain a new vector $V'_{RRP}(s)$ whose elements are $\{v'_n\}$.

$V'_{RRP}(0) = \begin{bmatrix} v'_1 \\ v'_2 \\ v'_3 \\ v'_4 \end{bmatrix} = \begin{bmatrix} 1 \\ 0 \\ 2 \\ 2 \end{bmatrix}$ Return to the Eq.-5) process and repeat the procedure with $V'_{RRP}(s)$ $M'_{RRP} = \begin{bmatrix} 0 & 1 & 0 & 0 \\ 1 & 0 & 0 & 0 \\ 0 & 0 & 1 & 0 \\ 0 & 0 & 1 & 0 \end{bmatrix}$  $M'_{TR} = \begin{bmatrix} 0 & 1 & 0 & 0 \\ 1 & 0 & 0 & 0 \\ 0 & 0 & 1 & 0 \\ 0 & 0 & 1 & 0 \end{bmatrix}$ Since $|\mathbb{N}_s| = 4$, On-line algorithm starts.

FIG. 10

On-line algorithm $$M^i_{TR} = \begin{bmatrix} 0 & \boxed{1} & 0 & 0 \\ \boxed{1} & 0 & 0 & 0 \\ 0 & 0 & \boxed{1} & 0 \\ 0 & 0 & \boxed{1} & 0 \end{bmatrix}$$

Eq.-10): $P^i_q = \prod_{p=0}^{N-1} G^i_{p \leftarrow q} = \begin{cases} 0 & \text{if output } q \text{ is reserved} \\ 1 & \text{otherwise.} \end{cases}$ Find output OA with no grant.

$[P^1_0, P^1_1, P^1_2, P^1_3] = [0, 0, 0, 1]$

Eq.-11): $Q^i_p = \prod_{q=0}^{N-1} G^i_{p \leftarrow q} = \begin{cases} 0 & \text{if input } p \text{ is granted} \\ 1 & \text{otherwise.} \end{cases}$ Find input IA without grant.

Output grant status
('AND' operation in each column)

Eq.-9): $G^i_{p \leftarrow q} = \begin{cases} 0 & \text{if input } p \text{ is granted for output } q \\ 1 & \text{otherwise.} \end{cases}$ '1' is available in the next iteration.

| P \ Q | 0 | 1 | 2 | 3 | |
|---|---|---|---|---|---|
| 0 | 1 | 0 | 1 | 1 | 0 $Q^1_0$ |
| 1 | 0 | 1 | 1 | 1 | 0 $Q^1_1$ |
| 2 | 1 | 1 | 0 | 1 | 0 $Q^1_2$ |
| 3 | 1 | 1 | 1 | 1 | 1 $Q^1_3$ |

Grant information

Contention occurs
→ 2$^{nd}$ Iteration starts $$M^i_{TR} = \begin{bmatrix} 0 & \boxed{1} & 0 & 0 \\ \boxed{1} & 0 & 0 & 0 \\ 0 & 0 & \boxed{1} & 0 \\ 0 & 0 & \boxed{1} & 0 \end{bmatrix}$$

| $M^2$ P\Q | 0 | 1 | 2 | 3 |
|---|---|---|---|---|
| 0 | 0 | 1 | 1 | 1 |
| 1 | 1 | 1 | 0 | 0 |
| 2 | 1 | 1 | 1 | 0 |
| 3 | 0 | 0 | 1 | 1 | next iteration
→ [0, 0, 0, 1]

Eq.-12): $M^{i+1}_{p \rightarrow q} = \begin{cases} 0 & \text{for } p \in \{p | Q^i_p = 1\}, q \in \{q | P^i_q = 0\} \\ M^i_{p \rightarrow q} & \text{otherwise} \end{cases}$ $[P^1_0, P^1_1, P^1_2, P^1_3] = [0, 0, 0, 1]$   $[P^1_0, P^1_1, P^1_2, P^1_3] = [0, 0, 0, 0]$ Full Match

| P \ Q | 0 | 1 | 2 | 3 | |
|---|---|---|---|---|---|
| 0 | 1 | 0 | 1 | 1 | 0 $Q^1_0$ |
| 1 | 0 | 1 | 1 | 1 | 0 $Q^1_1$ |
| 2 | 1 | 1 | 0 | 1 | 0 $Q^1_2$ |
| 3 | 1 | 1 | 1 | 1 | 1 $Q^1_3$ |

Grant information

| P \ Q | 0 | 1 | 2 | 3 | |
|---|---|---|---|---|---|
| 0 | 1 | 0 | 1 | 1 | 0 |
| 1 | 0 | 1 | 1 | 1 | 0 |
| 2 | 1 | 1 | 0 | 1 | 0 |
| 3 | 1 | 1 | 1 | 0 | 0 |

2$^{nd}$ Grant information

The grant frame is sent to the Line card.

FIG. 11 ced a centralized scheduling method and apparatus for improving a network efficiency and traffic delay performance, the apparatus in which a centralized scheduler effectively schedules non-uniform traffic based on a traffic distribution in a data center network having bursty and data-intensive traffic characteristics.

CENTRALIZED SCHEDULING APPARATUS AND METHOD CONSIDERING NON-UNIFORM TRAFFIC

CROSS-REFERENCE TO RELATED APPLICATION(S)

This application claims the priority benefit of Korean Patent Application No. 10-2019-0149423 filed on Nov. 20, 2019, in the Korean Intellectual Property Office, the disclosure of which is incorporated herein by reference for all purposes.

BACKGROUND

1. Field

The following description relates to a centralized scheduling method and apparatus that considers non-uniform traffic and, more particularly, to a centralized scheduling method and apparatus for performing effective scheduling based on a characteristic of non-uniform traffic in consideration of a traffic distribution in a data center network.

2. Description of Related Art

In order to accommodate explosive data traffic, a data center of today considers introducing a networking technology with low latency, low power consumption, and easy expansion compared to a typical electrical switch-based networking technology. A data center network structure utilizing the packet-based all-optical switch employs a distributed scheduling method by applying a complex optical control structure and forward-and-store buffer structure such as an expensive fiber delay-line and an optical-electric-optical loopback buffer.

Recently, a research plan for a data center network having a flat structure based on an optical switch adopting a store-and-forward input buffer structure using a low-cost electric buffer is being sought. The store-and-forward buffer structure based on the optical switch may require a centralized scheduler to solve output contention.

The centralized scheduler may perform N-to-N input-output matching within each scheduling time. A scheduling time and an input-output matching efficiency may have an important effect on a switch performance. A typical maximum matching scheduling algorithm may find a maximum input and output matching by performing round-robin using an independent arbiter at input and output stages.

iSLIP and DRRM, which are most widely used as the maximum matching scheduling algorithm, may guarantee 100% performance for uniform traffic. However, for non-uniform traffic the ISLIP and DRRM are vulnerable to a specific hotspot condition, so a scheduling technique that considers a traffic load is required. Also, a traffic characteristic and a delay requirement of the data center network may be different from those of a public network having a distributed control system. Moreover, the data center network may have a non-uniform traffic characteristic due to deployments of various applications and non-uniform distribution on the entire rack. As such, the data center network has a bursty traffic characteristic and a data-intensive heavy-tailed distribution. Due to this, traffic congestion may occur even when a link efficiency is about 25%, and an average delay difference between hotspot traffic and non-hotspot traffic may be large.

Therefore, to solve the above issues, a method for efficiently performing scheduling in a data center network in consideration of a traffic characteristic that traffic is non-uniformly distributed on the entire rack is required.

SUMMARY

An aspect provides a centralized scheduling method and apparatus for improving a network efficiency and traffic delay performance, the apparatus in which a centralized scheduler effectively schedules non-uniform traffic based on a traffic distribution in a data center network having bursty and data-intensive traffic characteristics.

Another aspect provides a centralized scheduling method and apparatus that considers a traffic load in a data center network and provides cyclic scheduling template-based scheduling enabling expansion of a cyclic period through a scaling factor, thereby improving performances for a specific hotspot condition and an average delay.

Another aspect provides a centralized scheduling method and apparatus that performs a real-time on-line algorithm using an RRP determined based on scheduling sequence information and a non-real-time off-line algorithm determining the scheduling sequence information based on a traffic distribution provided through traffic monitoring of a centralized cluster, thereby uniformly distributing initial pointers of an input arbiter and an output arbiter, more effectively matching the input arbiter and the output arbiter, and maximally improving a switching performance.

Another aspect provides a centralized scheduling method and apparatus for achieving a performance close to at most 100% under various hotspot conditions by uniformly distributing RRPs corresponding to an early stage of an on-line algorithm and, particularly, significantly reducing an average delay difference of traffic occurring in a hotspot and a non-hotspot.

Another aspect provides a centralized scheduling method and apparatus for finding an initial pointer of an input arbiter and an output arbiter of an on-line algorithm through an off-line algorithm and mapping a non-real-time traffic matrix used in the off-line algorithm to a real-time traffic matrix used in the on-line algorithm.

According to an aspect, there is provided a centralized scheduling method including generating a round-robin-pointer (RRP) sequence matrix using a non-real-time traffic matrix formed through traffic monitoring, generating a transportation-request (TR) Boolean matrix using a real-time traffic matrix formed based on the RRP sequence matrix, setting a pointer of an input arbiter and a point of an output arbiter corresponding to the TR Boolean matrix using a round-robin scheme, determining, based on the pointer of the input arbiter and the pointer of the output arbiter, whether an input arbiter matches an output arbiter in accordance with a messaging cycle, and generating a grant frame when matching between the input arbiter and the output arbiter is completed and transmitting the generated grant fame to a plurality of line-cards.

The generating of the RRP sequence matrix may include generating a normalized traffic matrix from the non-real-time traffic matrix and forming an RRP sequence matrix having a mutual pointing characteristic based on the normalized traffic matrix.

The generating of the normalized traffic matrix may generate a normalized traffic matrix in which traffic throughput under a predetermined condition is adjusted by applying a scaling factor to the non-real-time traffic matrix.

The forming of the RRP sequence matrix may minimize a number of elements in a row and a column having a maximum value in the normalized traffic matrix and form an RRP sequence matrix having a mutual pointing characteristic between an input arbiter and an output arbiter.

The forming of the RRP sequence matrix may determine a row and a column having a maximum value in the normalized traffic matrix, subtract "1" from a maximum value of elements of the determined row and column, exclude the maximum-value-subtracted row and column from the normalized traffic matrix, and minimize a number of the elements.

The forming of the RRP sequence matrix may extract N RRP sequences for an RRP sequence length in each interval of a time slot S based on a sequence step to generate an RRP sequence matrix having a size of N*S.

The generating of the TR Boolean matrix may include generating a real-time traffic Boolean matrix indicating an availability of scheduling between an input arbiter and an output arbiter in a predetermined interval in consideration of a status of virtual output queue (VOQ), extracting a column vector from an RRP sequence matrix based on a sequence step, generating an RRP Boolean matrix based on the column vector, and generating a TR Boolean matrix using the real-time traffic Boolean matrix and the RRP Boolean matrix.

The determining of whether the input arbiter matches the output arbiter may include verifying whether a plurality of elements included in the TR Boolean matrix is equal to a cardinality of a set having a value not being zero, generating, in a case of being equal, a request message of an input arbiter using a request frame transferred from N line-cards, sending the generated request message of the input arbiter to an output arbiter, generating a grant Boolean matrix including a grant message of an output arbiter for an input arbiter from an output arbiter receiving the request message, and determining whether input arbiters match output arbiters using the grant Boolean matrix.

According to another aspect, there is also provided a centralized scheduling method including generating scheduling sequence information using a scaling factor based on a traffic load of a network through traffic monitoring by applying an off-line algorithm, determining a pointer of an input arbiter and a pointer of an output arbiter using an RRP of the scheduling sequence information by applying an on-line algorithm, generating a request message of an input arbiter for message sending to correspond to a time order of the RRP, determining whether input arbiters match output arbiters in response to the request message, and generating a grant frame when matching between the input arbiters and the output arbiters is completed and transmitting the generated grant frame to a plurality of line-cards.

The generating of the scheduling sequence information may include setting scheduling sequence information corresponding to a time slot S repetitively performed based on a predetermined cycle, mapping scheduling sequence information and VOQ information for each input port, and updating an RRP of scheduling sequence information using the scheduling sequence information mapped to the VOQ information for each time slot of the time slot S.

The pointer of the input arbiter and the pointer of the output arbiter may be determined based on RRP sequence information associated with an input and RRP sequence information associated with an output of the off-line algorithm.

The determining of the pointer of the input arbiter and the pointer of the output arbiter may determine a pointer of an input arbiter and a pointer of an output arbiter in consideration of N RRP sequences for an RRP sequence length in each interval of a time slot S based on a sequence step.

The generating of the request message may generate a request message of an input arbiter upon every iteration of the time slot S.

The determining of whether the input arbiters match the output arbiters may include sending the generated request message of the input arbiter to an output arbiter, receiving a grant message of an output arbiter for an input arbiter from the output arbiter receiving the request message, and determining whether input arbiters match output arbiters based on a messaging cycle including the request message and the grant message.

When the input arbiters do not match the output arbiters, the determining of whether the input arbiters match the output arbiters may generate a grant message for a next iteration operation for an input arbiter and an output arbiter which are not matched.

According to another aspect, there is also provided a centralized scheduling apparatus including a processor, wherein the processor is configured to generate an RRP sequence matrix using a non-real-time traffic matrix formed through traffic monitoring, generate a TR Boolean matrix using a real-time traffic matrix formed based on the RRP sequence matrix, set a pointer of an input arbiter and a point of an output arbiter corresponding to the TR Boolean matrix using a round-robin scheme, determine, based on the pointer of the input arbiter and the pointer of the output arbiter, whether an input arbiter matches an output arbiter in accordance with a messaging cycle, and generate a grant frame when matching between the input arbiter and the output arbiter is completed and transmit the generated grant fame to a plurality of line-cards.

According to another aspect, there is also provided a centralized scheduling apparatus including a processor, wherein the processor is configured to generate scheduling sequence information using a scaling factor based on a traffic load of a network through traffic monitoring by applying an off-line algorithm, determine a pointer of an input arbiter and a pointer of an output arbiter using an RRP of the scheduling sequence information by applying an on-line algorithm, generate a request message of an input arbiter for message sending to correspond to a time order of the RRP, determine whether input arbiters match output arbiters in response to the request message, and generate a grant frame when matching between the input arbiters and the output arbiters is completed and transmit the generated grant frame to a plurality of line-cards.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 10 is a diagram illustrating a process of performing an off-line algorithm based on a 4×4 traffic matrix according to an example embodiment; and FIG. 11 is a diagram illustrating a process of performing an on-line algorithm based on a 4×4 traffic matrix according to an example embodiment.

DETAILED DESCRIPTION

Hereinafter, example embodiments will be described in detail with reference to the accompanying drawings.

Figure 1:
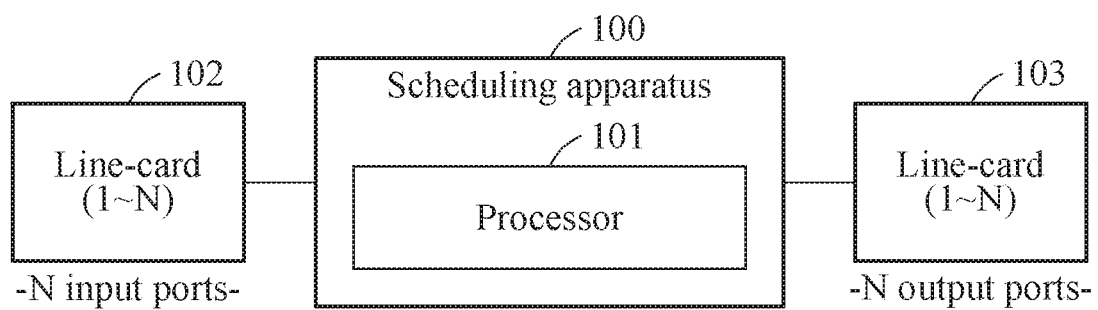
FIG. 1 is a diagram illustrating a centralized scheduling apparatus according to an example embodiment.

FIG. 1 is a diagram illustrating a centralized scheduling apparatus according to an example embodiment.

Referring to FIG. 1, a centralized scheduling apparatus 100 may provide a method for improving a performance of non-uniform traffic occurring on a data center network. More specifically, the centralized scheduling apparatus 100 may consider a non-uniform traffic characteristic of data centers non-uniformly placed in the entire rack, where a plurality of applications is deployed. The centralized scheduling apparatus 100 may effectively schedule the non-uniform traffic in consideration of a traffic distribution in the data center based on the non-uniform traffic characteristic.

The centralized scheduling apparatus 100 may be connected to line-cards (LC) 102 through 103 outside the centralized scheduling apparatus 100. The line-cards 102 through 103 may exist as N line-cards. Here, the line-cards 102 through 103 may perform a function of transmitting and receiving connections to enable communication. The line-card 102 may be an input port that delivers a request frame indicating a real-time traffic status for each destination to the centralized scheduling apparatus 100. The line-card 103 may be an output port that externally transmits a grant frame (GF) based on whether input arbiters (IA) are mapped to output arbiters (OA) in the centralized scheduling apparatus 100.

The centralized scheduling apparatus 100 may include a processor 101 to schedule non-uniform traffic based on a traffic distribution in a data center.

The processor 101 may generate a round-robin-pointer (RRP) sequence matrix using a non-real-time traffic matrix formed through traffic monitoring of a centralized cluster. Specifically, the processor 101 may generate a normalized traffic matrix from the non-real-time traffic matrix and form an RRP sequence matrix having a mutual pointing characteristic based on the normalized traffic matrix. Here, the processor 101 may generate a normalized traffic matrix in which traffic throughput under a predetermined condition is adjusted by applying a scaling factor to the non-real-time traffic matrix.

The processor 101 may minimize a number of elements in a row and a column having a maximum value in the normalized traffic matrix and form an RRP sequence matrix having a mutual pointing characteristic between an input arbiter and an output arbiter. Specifically, the processor 101 may determine a row and a column having a maximum value in the normalized traffic matrix, subtract "1" from a maximum value of elements of the determined row and column, exclude the maximum-value-subtracted row and column from the normalized traffic matrix, and minimize a number of the elements.

Also, the processor 101 may extract N RRP sequences for an RRP sequence length in each interval of a time slot S based on a sequence step to generate an RRP sequence matrix having a size of N*S.

The processor 101 may generate a transportation-request (TR) Boolean matrix using a real-time traffic matrix formed based on the RRP sequence matrix. The processor 101 may generate a real-time traffic Boolean matrix indicating an availability of scheduling between an input arbiter and an output arbiter in a specific interval considering a state of virtual output queue (VOQ). The processor 101 may extract a column vector from an RRP sequence matrix based on a sequence step, generate an RRP Boolean matrix based on the column vector, and generate a TR Boolean matrix using the real-time traffic Boolean matrix and the RRP Boolean matrix.

The processor 101 may set a pointer of an input arbiter and a point of an output arbiter corresponding to the TR Boolean matrix using a round-robin scheme. The processor 101 may determine whether an input arbiter matches an output arbiter in accordance with a messaging cycle based on the pointer of the input arbiter and the pointer of the output arbiter. The processor 101 may verify whether a plurality of elements included in the TR Boolean matrix is equal to a cardinality of a set having a value not being zero. Also, in a case of being equal, the processor 101 may generate a request message of an input arbiter using a request frame transferred from N line-cards and send the generated request message of the input arbiter to an output arbiter. The processor 101 may generate a grant Boolean matrix including a grant message of an output arbiter for an input arbiter from an output arbiter receiving the request message, and determine whether input arbiters match output arbiters using the grant Boolean matrix.

Thereafter, when matching between the input arbiter and the output arbiter is completed, the processor 101 may generate a grant frame and transmit the generated grant fame to a plurality of line-cards.

Also, the processor 101 may generate scheduling sequence information using a scaling factor based on a traffic load of a network through traffic monitoring by applying an off-line algorithm. The processor 101 may set scheduling sequence information corresponding to a time slot S repetitively performed based on a predetermined cycle, and map scheduling sequence information and VOQ information for each input port. The processor 101 may update an RRP of scheduling sequence information using the scheduling sequence information mapped to the VOQ information for each time slot of the time slot S.

Here, the pointer of the input arbiter and the pointer of the output arbiter may be determined based on RRP sequence information associated with an input and RRP sequence information associated with an output of the off-line algorithm. Also, the processor 101 may determine a pointer of an input arbiter and a pointer of an output arbiter in consideration of N RRP sequences for an RRP sequence length in each interval of the time slot S based on a sequence step.

The processor 101 may determine a pointer of an input arbiter and a pointer of an output arbiter using an RRP of the scheduling sequence information by applying an on-line algorithm. The processor 101 may generate a request message of an input arbiter for message sending to correspond to a time order of the RRP. The processor 101 may send the generated request message of the input arbiter to an output arbiter, receive a grant message of an output arbiter for an input arbiter from the output arbiter receiving the request message, and determine whether input arbiters match output arbiters based on a messaging cycle including the request message and the grant message.

The processor 101 may determine whether input arbiters match output arbiters in response to the request message. Thereafter, when matching between the input arbiters and the output arbiters is completed, the processor 101 may generate a grant frame and transmit the generated grant frame to a plurality of line-cards.

Figure 2:
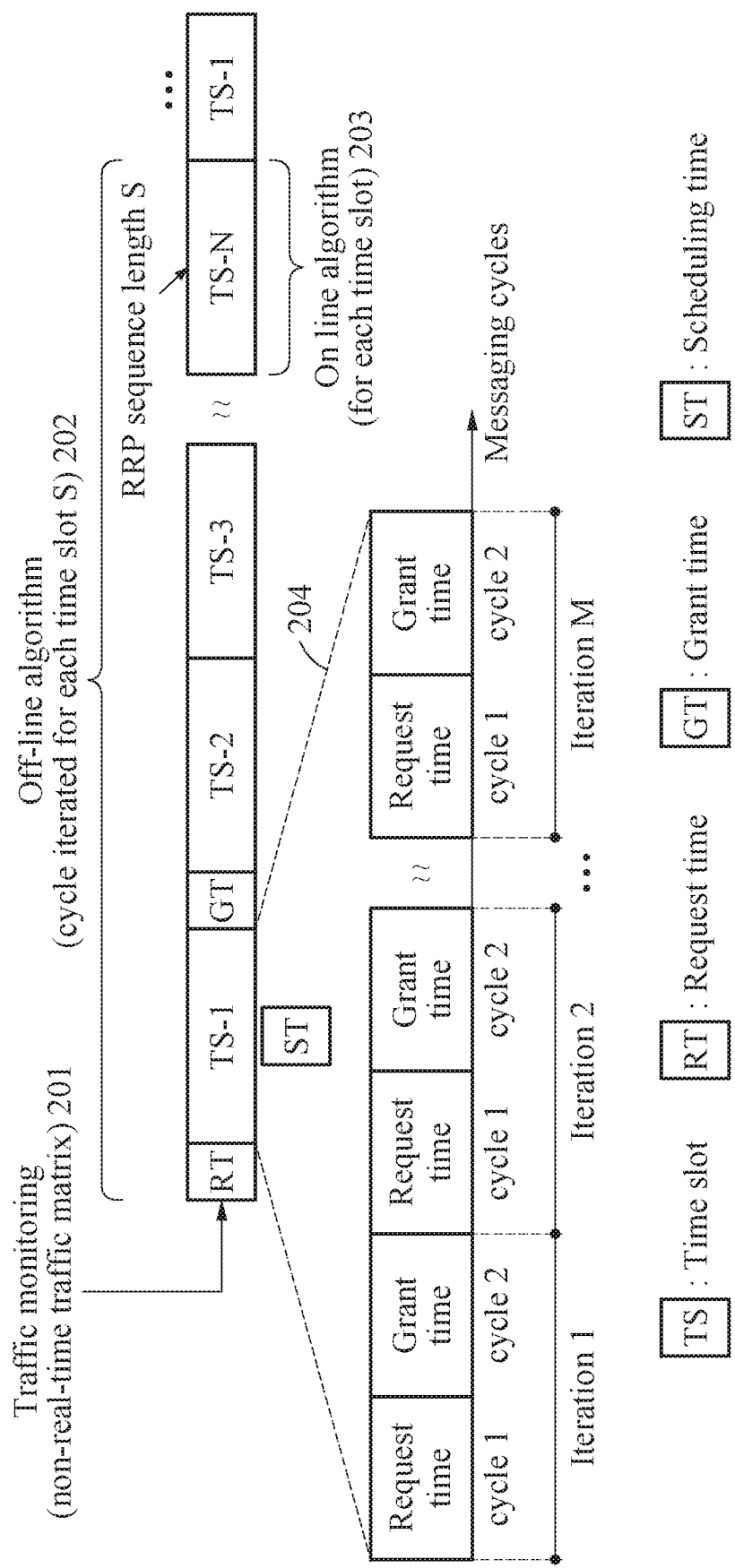
FIG. 2 is a diagram illustrating a method for performing N-to-N scheduling using a time-slot-based on-line algorithm and an off-line algorithm on a data center network according to an example embodiment.

FIG. 2 is a diagram illustrating a method for performing N-to-N scheduling using a time-slot-based on-line algorithm and an off-line algorithm on a data center network according to an example embodiment.

FIG. 2 illustrates a relationship of a time slot, iteration, and a messaging cycle for scheduling in the centralized scheduling apparatus 100. The centralized scheduling apparatus 100 may perform a time-slot-based N-to-N input and output (I/O) scheduling on a data center network. The centralized scheduling apparatus 100 may perform the time-slot-based I/O scheduling using an off-line algorithm 202 and an on-line algorithm 203.

① Off-Line Algorithm

The off-line algorithm 202 is a non-real-time algorithm that generates an RRP sequence matrix using a non-real-time traffic matrix acquired for each time slot S through traffic monitoring 201. The RRP sequence matrix may include an input RRP sequence matrix and an output RRP sequence matrix.

② On-Line Algorithm

The on-line algorithm 203 is a real-time algorithm that performs an adjustment between a pointer of an input arbiter and a pointer of an output arbiter using a predetermined input RRP sequence matrix and an output RRP sequence matrix for each time slot. The pointer of the input arbiter and the pointer of the output arbiter may correspond to an initial pointer for performing the scheduling.

Also, total iteration counts 204 in a single time slot (TS) may be set based on a switch port configuration and a time of a time slot. A time slot TS may include the following elements.

① Request Time (RT)

The request time may refer to a time required for N input ports interworking outside a centralized scheduling apparatus to request scheduling for N output ports from the centralized scheduling apparatus.

② Grant Time (GT)

The grant time may refer to a time required for the centralized scheduling apparatus to deliver scheduled information of the N output ports to the N input ports interworking outside the centralized scheduling apparatus.

③ Scheduling Time (ST)

The scheduling time may refer to a time spent for N input-output port matching. Here, the scheduling time may include a messaging cycle including M configurable iterations. A single iteration may be performed based on a 2-cycle scheme including a request message and a grant message.

Figure 3:
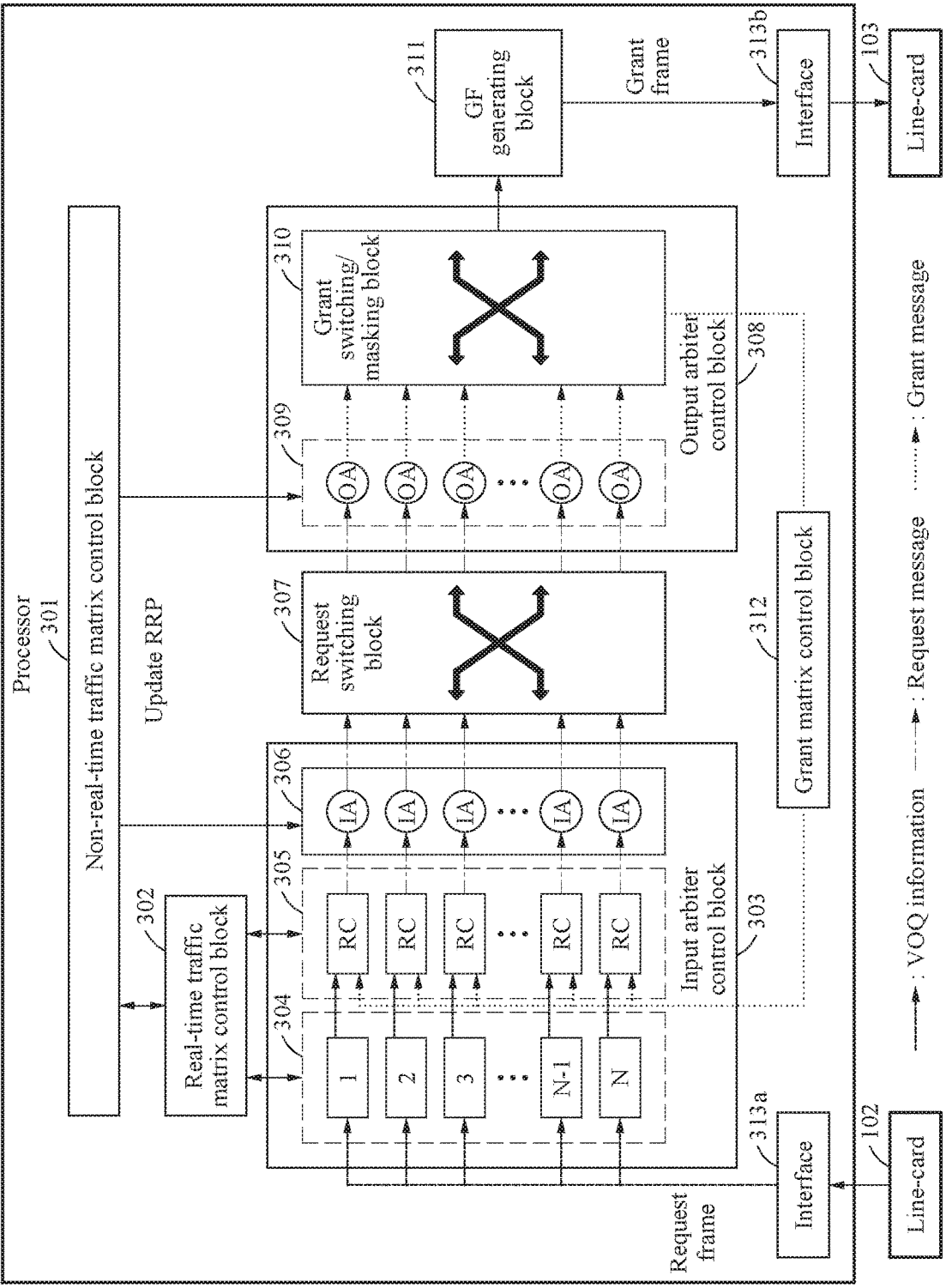
FIG. 3 is a diagram illustrating a detailed structure of a centralized scheduling apparatus according to an example embodiment.

FIG. 3 is a diagram illustrating a detailed structure of a centralized scheduling apparatus according to an example embodiment.

Referring to FIG. 3, the centralized scheduling apparatus 100 may include the processor 101. The processor 101 may perform scheduling according to a plurality of blocks.

More specifically, the processor 101 may include a non-real-time traffic matrix control block 301, a real-time traffic matrix control block 302, an input arbiter control block 303, a request switching block 307, an output arbiter control block 308, a grant frame generating block 311, a grant matrix control block 312, interface blocks 313a through 313b, and N line-cards 313a through 103 interworking outside the centralized scheduling apparatus 100.

The non-real-time traffic matrix control block 301 may acquire RRP sequence information using an off-line algorithm from a non-real-time traffic matrix through traffic monitoring of a centralized cluster in a network of a data center.

the non-real-time traffic matrix control block 301 may determine overall RRP sequence information in an S-time slot for executing an on-line algorithm. The non-real-time traffic matrix control block 301 may perform a mapping process of VOQ information acquirable in real time using the on-line algorithm and RRP sequence information acquired from a non-real-time traffic matrix using the off-line algorithm. Here, the RRP sequence information may include input RRP sequence information and output RRP sequence information.

The non-real-time traffic matrix control block 301 may update input-output RRP values of an input arbiter block 306 and an output arbiter block 309 based on the input RRP sequence information and the output RRP sequence information, to perform the on-line algorithm for each time slot.

A VOQ block 304 included in the input arbiter control block 303 may acquire VOQ information for next time-slot scheduling. The VOQ block 304 may transmit the VOQ information to the non-real-time traffic matrix control block 301.

The real-time traffic matrix control block 302 may receive RRP sequence information for a first iteration of the on-line algorithm from the non-real-time traffic matrix control block 301. The real-time traffic matrix control block 302 may transmit the RRP sequence information for the first iteration of the on-line algorithm received from the real-time traffic matrix control block 302 to a request control block 305. When the input-output matching has not been completed through the scheduling, the real-time traffic matrix control block 302 may generate a new RRP sequence matrix for M next iterations of the on-line algorithm.

The input arbiter control block 303 may include the VOQ block 304, the request control block 305, and the input arbiter block 306 for each of the N input ports.

The VOQ block 304 may receive a request frame (RF) of a real-time traffic status for each destination port of each input port from N line-cards 102 interworking with the centralized scheduling apparatus 100 in an external area.

Here, the request frame may represent a queue status for each destination port of each input port.

The request control block 305 may control an RRP of the input arbiter block 306 in a round-robin scheme from RRP sequence information received from the real-time traffic matrix control block 302.

The input arbiter block 306 may set a pointer corresponding to an early stage of an input arbiter based on input RRP sequence information received from the non-real-time traffic matrix control block 301 for each time slot. Also, the input arbiter block 306 may update an input RRP through the request control block 305 upon every iteration.

The input arbiter block 306 may generate a request message of a currently set RRP. The input arbiter block 306 may send the generated request message to the output arbiter control block 308 through the request switching block 307 upon every iteration.

The request switching block 307 may set the request message received from the input arbiter block 306 to the corresponding output arbiter block 309 in the output arbiter control block 308.

The output arbiter control block 308 may include the output arbiter block 309 and a grant switching and masking block 310.

The output arbiter block 309 may set an initial RRP based on output RRP sequence information received from the non-real-time traffic matrix control block 301 for each time slot, and update an output RRP in the round-robin scheme upon every iteration.

The grant switching and masking block 310 may collect granted RRP sequence information from the output arbiter block 309, and then perform a masking task. The grant switching and masking block 310 may recognize whether full matching is performed after generating a grant message. When the full matching is not performed, to a GF generating block 311, the grant switching and masking block 310 may send the generated grant message to the grant matrix control block 312 for a next iteration.

The GF generating block 311 may collect the grant message from the grant switching and masking block 310, generate a grant frame, and send the grant frame to a grant receiving block in the N line-cards 103 interworking with an external source of the centralized scheduling apparatus 100 through the interface block 313b.

The grant matrix control block 312 may collect the grant messages from the grant switching and masking block 310 and generate a grant matrix. The grant matrix control block 312 may transmit, to the request control block 305 in the input arbiter control block 303, a grant matrix having the grant message generated from the grant switching and masking block 310 such that input arbiters for which input-output matching of the next iteration fails generate new request messages.

The interface blocks 313a through 313b may include physical interfaces such as GbE/SGMII/10 GbE and located between the centralized scheduling apparatus 100 and the N external line-cards 102 through 103. The interface block 313a may receive the request frame from the line-card 102, and the interface block 313b may transmit the grant frame generated in the grant frame GF generating block 311 to the line-card 103.

The N external line-cards 102 through 103 may be classified into a request transmitting block 102 and a grant receiving block 103 to communicate with the centralized scheduling apparatus 100.

In the centralized scheduling apparatus 100 having the above structure, the request frames RF of the N external line-cards 102 may be transmitted to the VOQ block 304 through the interface block 313a, and the VOQ information may be transmitted to a request control (RC) block 305. Request message information may be transmitted from the request control block 305 through the input arbiter block 306 and the request switching block 307 to the output arbiter block 309. Grant message information may be transmitted from the output arbiter block 309 through the grant switching and masking block 310 to the GF generating block 311 and the grant matrix control block 312.

Figure 4:
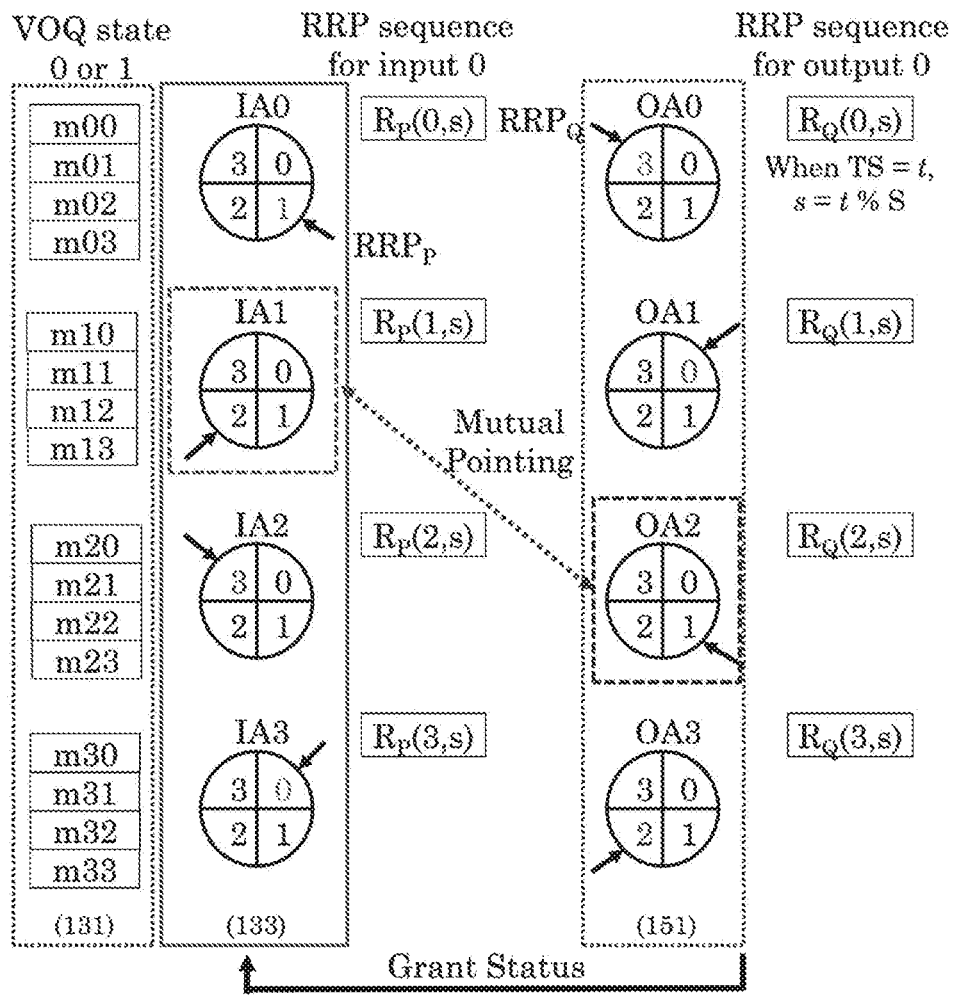
FIG. 4 is a diagram illustrating characteristics of an input arbiter and an output arbiter in independent forms according to an example embodiment.

FIG. 4 is a diagram illustrating characteristics of an input arbiter and an output arbiter in independent forms according to an example embodiment.

An off-line algorithm may adjust RRPs (hereinafter, also referred to as "pointer") of an input arbiter block 302 and an output arbiter block 308 to be distributed between all input arbiters and output arbiters. RRPs of an input arbiter and an output arbiter may be uniformly distributed based on an input RRP sequence $R_P(p,s)$ and an output RRP sequence $R_Q(q,s)$ of the off-line algorithm.

$R_P(p,s)$ and $R_Q(q,s)$ may be defined for an input port p (e.g., p=0 to (N−1)), an output port q (e.g., q=0 to (N−1)), and a sequence step s (e.g., s=0 to (S−1)) when a switch size is "N×N." Here, S is a total RRP sequence length. FIG. 4 shows an example embodiment in a case in which a switch size is "4×4."

Specifically, when a time slot count is t, an RRP of an input $p_0$ port arbiter may indicate $R_P(p_0, t \bmod S)$ and an RRP of an output $q_0$ port arbiter may indicate $R_P(q_0, t \bmod S)$. For s0, $R_P(p,s)$ and $R_Q(q,s)$ satisfy the following characteristics to maximize matching between the input arbiter and the output arbiter.

Characteristic-1) No overlap: If, $p_1 \neq p_2$, $R_P(p_1,s_0) \neq R_P(p_2,s_0)$ and if $q_1 \neq q_2$, $R_Q(q_1,s_0) \neq R_Q(q_2,s_0)$.

Characteristic-2) Mutual pointing: If, $R_P(p_1,s_0)=q_1$, $R_Q(q_1,s_0)=p_1$.

A centralized scheduling method of the present disclosure may be expressed by the following equations to easily describe a generation of an input RRP matrix.

The off-line algorithm may calculate an input $R_P(p,s)$ and an output $R_Q(q,s)$ representing an input-output RRP sequence based on a traffic distribution. Here, the traffic distribution may be obtained by monitoring network statistics in a centralized cluster in a data center network, or through a network planning. In the present disclosure, a non-real-time traffic matrix Λ is defined as $\Lambda=[\lambda_{pq}]$ in which $\lambda_{pq}$ denotes elements of a p-th row and a q-th column representing traffic loads (e.g., 0 to 100% or average bit rate) from the input port p to the output port q. A normalized traffic matrix W may be defined as shown in Equation 1 below.

$$W=[w_{pq}]=k\Lambda/\lambda_{min} \quad \text{[Equation 1]}$$

Equation 1 represents a normalized traffic matrix. In Equation 1, $\lambda_{min}$ is $\lambda_{min}=\min_{p \in P, q \in Q} \lambda_{pq}$ and k denotes a scaling factor. In a case in which k=1, throughput of the centralized scheduling apparatus 100 may be reduced under a specific hotspot condition. This is because, when k=1, a quantization error that occurs has a significant effect, so RRP sequence information determined using the off-line algorithm may not reflect an accurate traffic distribution. Here, the quantization error may cause a degradation in performance at several hotspot points, but if the scaling factor k increases to "5" or a number of iterations increases, the centralized scheduling apparatus 100 may achieve at most 100% throughput under any hotspot condition.

In other words, when a higher scaling factor (e.g., k=5) is set, a switching bandwidth may be more accurately allocated and the centralized scheduling apparatus 100 may achieve at most 100% throughput even through a single iteration. Also, using a high scaling factor coefficient value, a bandwidth of each input and output may be more accurately calculated. The total sequence length S may be determined as shown in Equation 2 below.

$$S = \lceil (\Sigma_{p,q=0}^{N-1} w_{pq})/N \rceil \quad \text{[Equation 2]}$$

Equation 2 represents a total sequence length obtained when a traffic distribution is a non-uniform distribution. Also, a total sequence length S obtained when a traffic distribution is a uniform distribution is defined as kN. Input RRP sequence information and output RRP sequence information may be used to obtain $R_P(p,s)$ and $R_Q(q,s)$ while minimizing a maximum element value of the matrix W. Each time that the maximum value is selected, other elements of the selected row and column may be excluded. Such selecting process may be repeated until N values are selected.

Figure 5:
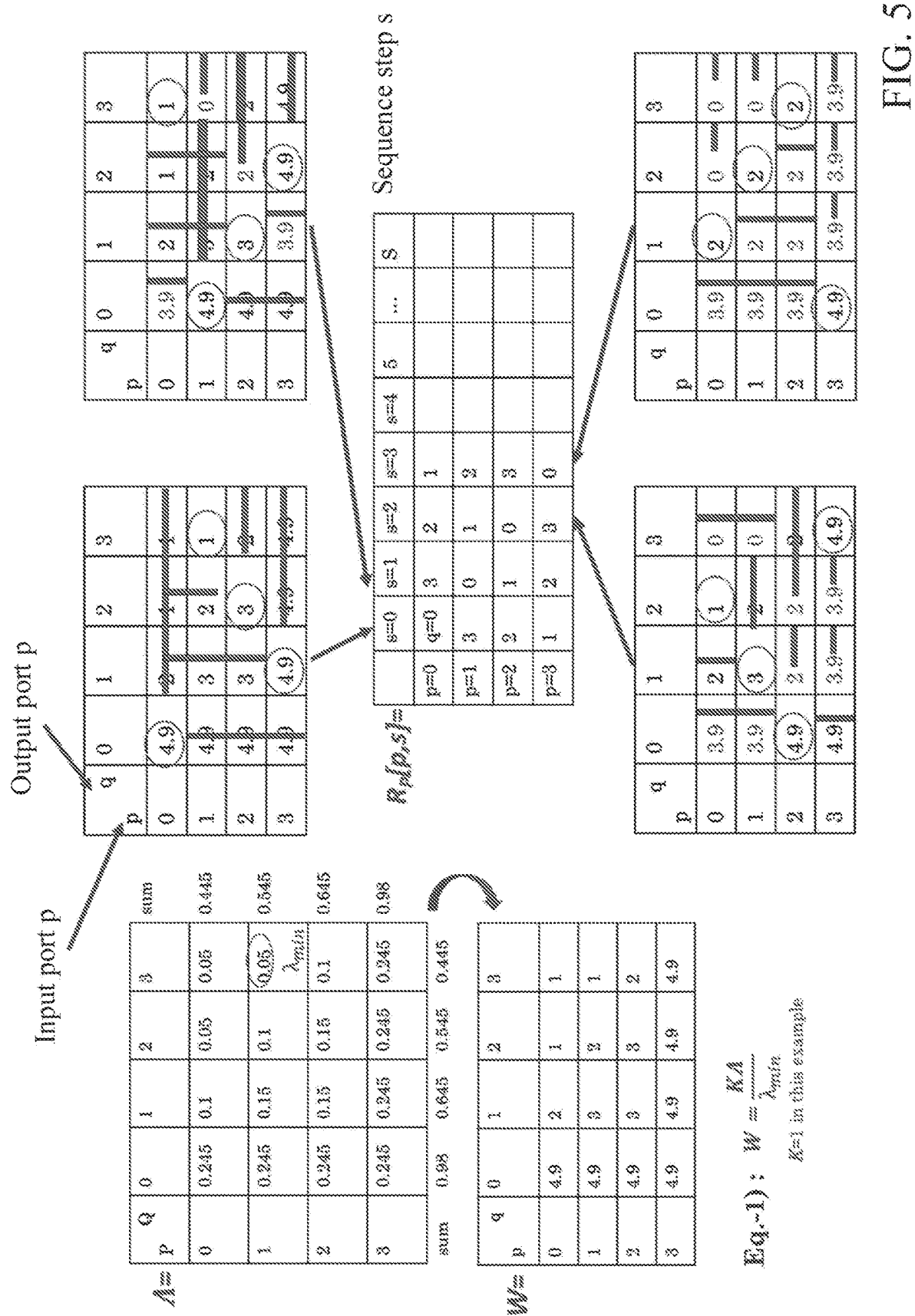
FIG. 5 is a diagram illustrating an example of finding an input round-robin-pointer (RRP) sequence matrix in a case of a 4×4 switch configuration according to an example embodiment.

FIG. 5 is a diagram illustrating an example of finding an input RRP sequence matrix in a case of a 4×4 switch configuration according to an example embodiment.

A centralized scheduling method of the present disclosure may select an element having a maximum value from a matrix W when defining an RRP sequence, maintain a selection counter value of each element of the matrix W, and increase the selection counter value by "1" each time that an element is selected. A centralized scheduling apparatus of the present disclosure may select an element value in a round-robin scheme when an element having a smaller selection counter value is selected under a tie-break condition and several maximum values have the same selection counter value. When an input-output pair is selected, the centralized scheduling apparatus may subtract "1" from a selected element value to find an RRP of a next sequence step.

The centralized scheduling apparatus may be expressed by the following equations to easily describe operations for performing an off-line algorithm and an on-line algorithm based on an input RRP sequence matrix.

A real-time traffic Boolean matrix $M^1$ that expresses an availability of scheduling of a VOQ from an input port p to an output port q (e.g., $VOQ_{p \to q}$) in an i-th iteration for a section $1 \le i \le I_{max}$ may be defined. Here, an element $M_{p \to q}^i$ of a (p+1)-th row and a (q+1)-th column of the matrix $M^i$ may be expressed as shown in Equation 3 in which $I_{max}$ denotes a total number of iterations to be set within a given scheduling time.

$$M_{p \to q}^i = \begin{cases} 0 & \text{if } VOQ_{p \to q} \text{ is empty} \\ 1 & \text{otherwise} \end{cases} \quad \text{[Equation 3]}$$

In the real-time traffic matrix control block 302, $M_{p \to q}^1$ of a first iteration may be the same as that of a current VOQ status (e.g., a case in which a packet to be transmitted by $VOQ_{p \to q}$ is present).

When the off-line algorithm finds an input RRP sequence from a traffic distribution, a column vector corresponding to a sequence step s may be obtained as shown in Equation 4 below.

$$V_{RRP}(s) = [v_1, v_2, \ldots, v_N]^T \quad \text{[Equation 4]}$$

Equation 4 represents a column vector corresponding to the sequence step s. The column vector may be selected from an input matrix $R_P(p,s)$. In Equation 4, s denotes a sequence step and $v_N$ denotes an output port number in $0 \le v_N \le (N-1)$.

A Boolean matrix $M_{RRP}$ may be defined based on $V_{RRP}(s)$ obtained using Equation 4, as shown in Equation 5 below.

$$M_{RRP} = \Sigma_{n=1}^{N} V_n V_{v_n+1}^T \quad \text{[Equation 5]}$$

Equation 5 represents a Boolean matrix. In Equation 5, $V_n$ denotes a column vector in which only an n-th element is "1" and other elements are "0."

By performing an AND operation of the matrices $M^1$ and $M_{RRP}$, a new Boolean matrix $M_{TR}$ may be defined as shown in Equation 6 below.

$$M_{TR} := M^1 \wedge M_{RRP} \quad \text{[Equation 6]}$$

From the obtained matrix $M_{TR}$, the centralized scheduling apparatus may check whether a sum of all elements of the matrix $M_{TR}$ is equal to $|\mathbb{N}_s|$. Here, $|\mathbb{N}_s|$ may be expressed as a size of a set as shown in Equation 7. The size of the set may be a cardinality. The cardinality may be a measure of a number of elements included in the set.

$$\mathbb{N}_s = \{p | \Sigma_q M_{p \to q}^1 \neq 0\} \quad \text{[Equation 7]}$$

If a sum of all elements is equal to $|\mathbb{N}_s|$, the centralized scheduling apparatus may acknowledge that all input arbiters are ready to request messages to corresponding output arbiters and appropriately initialized to start the online algorithm. When the on-line algorithm is terminated, the centralized scheduling apparatus may increase a sequence step by "s+1" for next time slot arbitration, and then repeat a procedure from an operation applying Equation 4 for a sequence step s+1.

If a sum of all elements is not equal to $|\mathbb{N}_s|$, the centralized scheduling apparatus may move to an operation applying Equation 8 because an input arbiter (IA) that needs to be initialized to send a request message still remains. A search for a suitable output port from a given input may be required to process an uninitialized request in Equation 7. Here, the search may be performed by changing an element $v_n$ of $V_{RRP}(s)$ as shown in Equation 8.

$$v_n \to v'_n := (v_n+1) \bmod N \text{ for } n \in \bar{n} \quad \text{[Equation 8]}$$

In Equation 8, $\bar{n}$ is, for example, $\Sigma_m M_{TR,n,m} = 0$ and a set of n. $M_{TR,n,m}$ denotes an element of an n-th row and an m-th column of the matrix $M_{TR}$. In this instance, a new vector $V'_{RRP}(s)$ including $\{v'_n\}$ as an element may be obtained. Using the obtained $V'_{RRP}(s)$, an iteration of a procedure may be performed again from an operation applying Equation 5.

The centralized scheduling apparatus may define a grant Boolean matrix $G^i$ including grant information of output arbiters (OA) for all input arbiters (IA) at an i-th iteration. After a grant message is generated through the grant switching and masking block 310, the centralized scheduling apparatus may send the grant message through the grant matrix control block 312. An element $G_{p \leftarrow q}^i$ of a (p+1)-th row and a (q+1)-th column of the matrix $G^i$ may be expressed as shown in Equation 9 below.

$$G_{p \leftarrow q}^i = \begin{cases} 0 & \text{if input } p \text{ is granted for output } q \\ 1 & \text{otherwise} \end{cases} \quad \text{[Equation 9]}$$

In Equation 9, to find $P_q^i$ that indicating a grant status of output arbiters at the i-th iteration, the "AND" operation for each row may be used as a masking bit for a next iteration to indicate whether the corresponding output port q is reserved, which can be expressed as Equation 10 in which a value "0" is a valid value in the matrix $G^i$.

$$P_q^i = \prod_{p=0}^{N-1} G_{p \leftarrow q}^i = \begin{cases} 0 & \text{if output } q \text{ is reserved} \\ 1 & \text{otherwise} \end{cases} \quad \text{[Equation 10]}$$

Through such arrangement, the centralized scheduling apparatus may extract grant information and mask information based on the logic "AND" operation. In order to find $Q_P^i$ indicating a grant status of input arbiters at the i-th iteration, the "AND" operation among logic operations for each column may be used as grant information of each input port p. This can be expressed as Equation 11.

$$Q_p^i = \prod_{q=0}^{N-1} G_{p \leftarrow q}^i = \begin{cases} 0 & \text{if input } p \text{ is granted} \\ 1 & \text{otherwise} \end{cases} \quad \text{[Equation 11]}$$

The centralized scheduling apparatus, for example, an input arbiter may select one of VOQs available of scheduling at each iteration based on the round-robin scheme. Also, a matrix $M_{p \to q}^{i+1}$ indicating a schedulability at an (i+1)-th iteration may be determined at the i-th iteration based on a grant status and a schedulability. This can be expressed as Equation 12.

$$M_{p \to q}^{i+1} = \begin{cases} 0 & \text{for } p \in \{p \mid Q_p^i = 1\}, q \in \{q \mid P_q^i = 0\} \\ M_{p \to q}^i & \text{otherwise} \end{cases} \quad \text{[Equation 12]}$$

Figure 6:
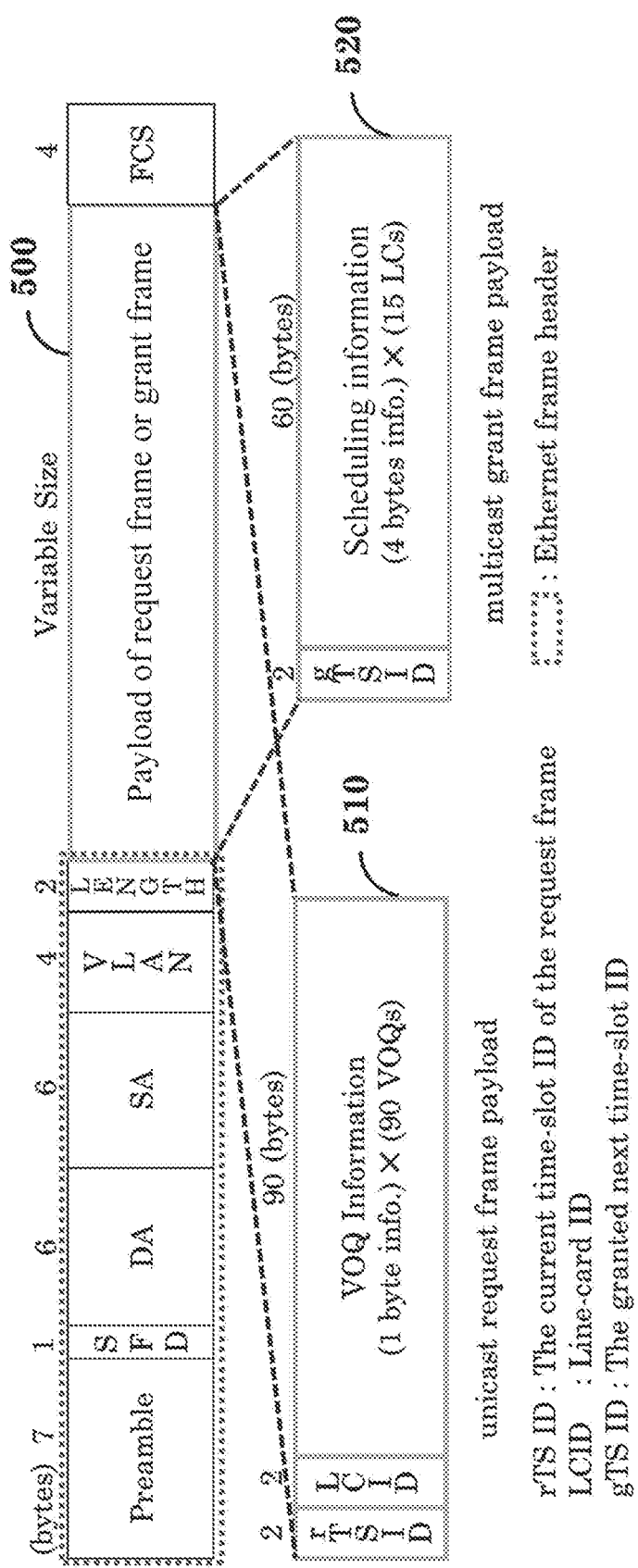
FIG. 6 is a diagram illustrating detailed structures of a requested frame (RF) and a grant frame (GF) used in an external line-card and a centralized scheduling apparatus according to an example embodiment.

FIG. 6 is a diagram illustrating detailed structures of a requested frame (RF) and a grant frame (GF) used in an external line-card and a centralized scheduling apparatus according to an example embodiment.

When considering a 90×90 switch configuration, the centralized scheduling apparatus 100 may manage 15 line-cards as a single VLAN group. The centralized scheduling apparatus 100 may receive 90 unicast frames (e.g., request frames RF) from each of the external line-card 102 and transmit six multicast frames (e.g., grant frames GF) for six VLAN groups to the external line-card 103.

As shown in FIG. 5, the request frame RF and the grant frame GF may include a generic ethernet header. A payload 510 of each request frame RF may include information of all VOQs and configured with a payload size of 90 bytes in total, one byte per port of a VOQ. A payload 520 of the grant frame GF may include scheduling information.

Here, a payload size of the grant frame GF may be 60 (=4×15) bytes in total. Also, each binary-encoded 4 bytes may include grant information of each switch output port for 15 source line-cards. Each source line-card receiving the grant frame GF may use corresponding scheduling information based on a byte position.

In the present disclosure, it is not intended to limit the payload sizes of the request and grant frames as described above, it is simply expressed for ease of description, and its length may vary based on a switch configuration.

Figure 7:
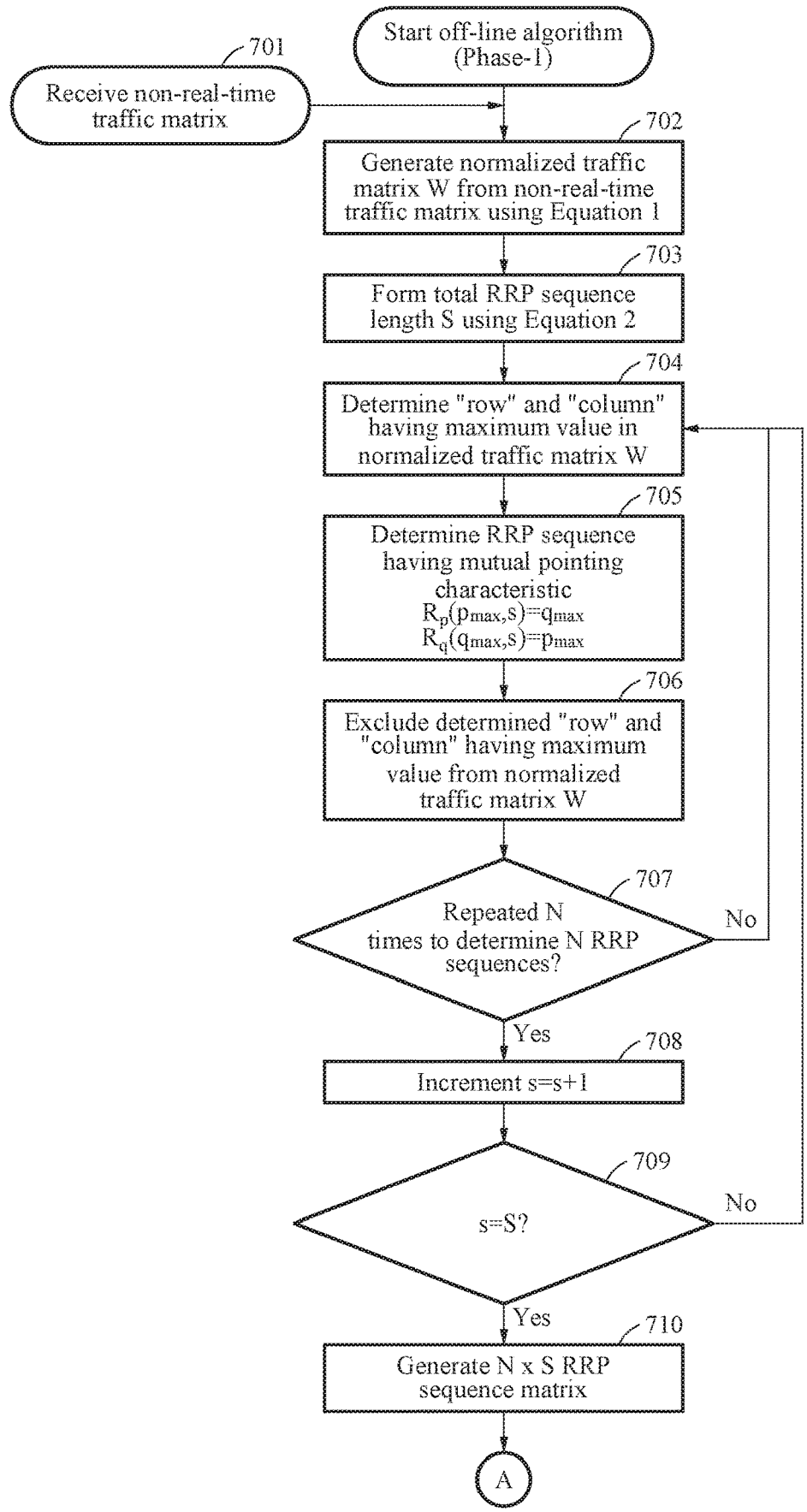
FIG. 7 is a flowchart (phase-1) illustrating a process of performing an off-line algorithm that generates an N×S RRP sequence matrix from a non-real-time traffic matrix according to an example embodiment.

FIG. 7 is a flowchart (Phase-1) illustrating a process of performing an off-line algorithm that generates an N×S RRP sequence matrix from a non-real-time traffic matrix according to an example embodiment.

Referring to FIG. 7, a centralized scheduling apparatus shows an overall operation flowchart of an off-line algorithm according to an example embodiment and performs an operation for extracting input RRP sequence information and output RRP sequence information from a non-real-time traffic matrix.

In operation 701, the centralized scheduling apparatus 100 may receive a non-real-time traffic matrix formed through traffic monitoring of a centralized cluster.

In operation 702, the centralized scheduling apparatus 100 may generate a normalized traffic matrix W from the non-real-time traffic matrix using Equation 1 of FIG. 4. Specifically, the centralized scheduling apparatus 100 may generate a normalized traffic matrix of which traffic throughput under a specific condition is adjusted by applying a scaling factor to the non-real-time traffic matrix.

In operation 703, the centralized scheduling apparatus 100 may extract a total RRP sequence length S (e.g., s=0 to (S−1)) using Equation 2 of FIG. 4.

In operation 704, the centralized scheduling apparatus 100 may extract a row $p_{max}$ and a column $q_{max}$ having a maximum value in the normalized traffic matrix.

In operation 705, the centralized scheduling apparatus 100 may determine an RRP sequence having a mutual pointing characteristic.

When a row and a column having a maximum value in the normalized traffic matrix is determined in operation 705, the centralized scheduling apparatus 100 may subtract "1" from the maximum value of elements of the determined row and column and exclude the maximum-value-subtracted row and column, for example, the row $p_{max}$ and column $q_{max}$ from the normalized traffic matrix in operation 706.

In operation 707, the centralized scheduling apparatus 100 may verify whether operation 706 is repeated N times in operation 704 to find N RRP sequences for a current sequence step s.

If not repeated N times as a result of operation 707, the centralized scheduling apparatus 100 may perform operation 704 again such that the operation is repeated N times.

If repeated N times as a result of operation 707, in operation 708, the centralized scheduling apparatus 100 may increase a current sequence step s by "1" when the N RRP sequences are found.

In operation 709, the centralized scheduling apparatus 100 may verify whether the sequence step s is completed up to a step (S−1).

When it is verified in operation 709 that s does not have a value of S, the centralized scheduling apparatus 100 may perform operation 704 again.

Figure 8:
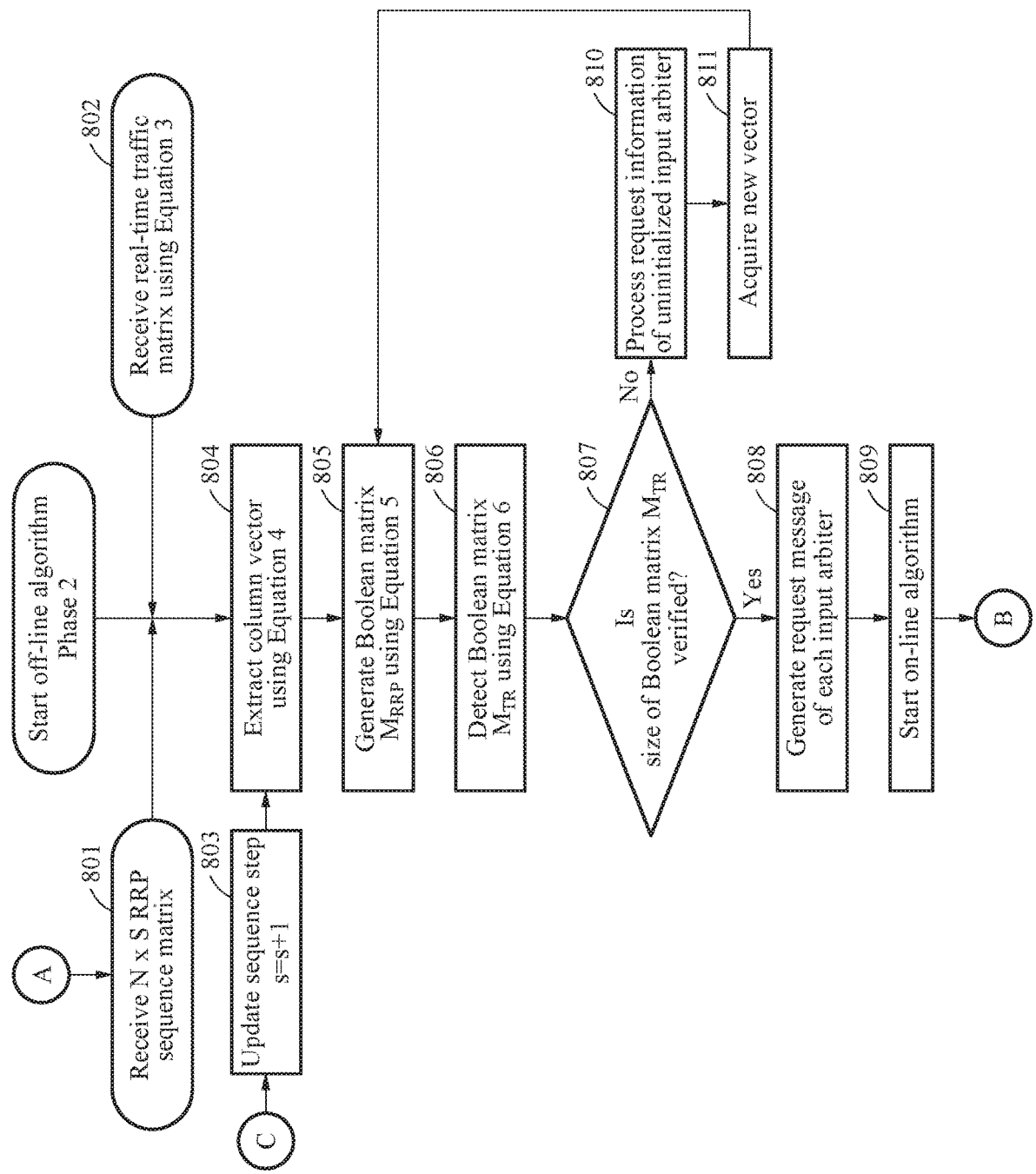
FIG. 8 is a flowchart (phase-2) illustrating a process of performing an off-line algorithm that generates a request message for each input arbiter to perform an on-line algorithm from an N×S RRP sequence matrix according to an example embodiment.

When it is verified in operation 709 that s has a value of S, the centralized scheduling apparatus 100 may generate an N×S RRP sequence matrix in operation 710, and then perform operation A of FIG. 8.

FIG. 8 is a flowchart (phase-2) illustrating a process of performing an off-line algorithm that generates a request message for each input arbiter to perform an on-line algorithm from an N×S RRP sequence matrix according to an example embodiment.

Referring to FIG. 8, a centralized scheduling apparatus may generate a request message of each input arbiter (IA) required to perform an on-line algorithm from a generated N×S RRP sequence matrix.

In operation 801, the centralized scheduling apparatus may receive an N×S RRP sequence matrix generated in operation 710 of FIG. 7.

In operation 802, the centralized scheduling apparatus may receive a real-time traffic matrix formed according to Equation 3 of FIG. 5.

In operation 804, the centralized scheduling apparatus may extract a column vector corresponding to "s=0" in an RRP sequence matrix using the RRP sequence matrix and the real-time traffic matrix. Here, the centralized scheduling apparatus may extract the column vector in the RRP sequence matrix using Equation 4 of FIG. 5.

In operation 805, the centralized scheduling apparatus may generate an RRP Boolean matrix $M_{RRP}$ using the column vector extracted in operation 804 using Equation 5 of FIG. 5.

In operation 806, the centralized scheduling apparatus may generate a TR Boolean matrix using the real-time traffic matrix and the RRP Boolean matrix according to Equation 6 of FIG. 5.

In operation 807, the centralized scheduling apparatus may verify a size of the TR Boolean matrix. Specifically, the centralized scheduling apparatus may verify whether a sum of all elements of the TR Boolean matrix is equal to a cardinality of a set based on Equation 7 of FIG. 5.

When it is verified in operation 807 that a sum of all elements of the TR Boolean matrix is not equal to the cardinality of the set, in operation 810, the centralized scheduling apparatus may shift $v_n$ of VRRP(s) using Equation 8 of FIG. 5 to process request information of an uninitialized input arbiter. In operation 811, the centralized scheduling apparatus may acquire a new $V'_{RRP}(s)$ vector. The centralized scheduling apparatus may perform operation 805 again after performing operation 811.

When it is verified in operation 807 that a sum of all elements of the TR Boolean matrix is equal to the cardinality of the set, in operation 808, the centralized scheduling apparatus may generate a request message of each input arbiter. In other words, the centralized scheduling apparatus may generate request messages of input arbiters using request frames transferred from N line-cards.

Figure 9:
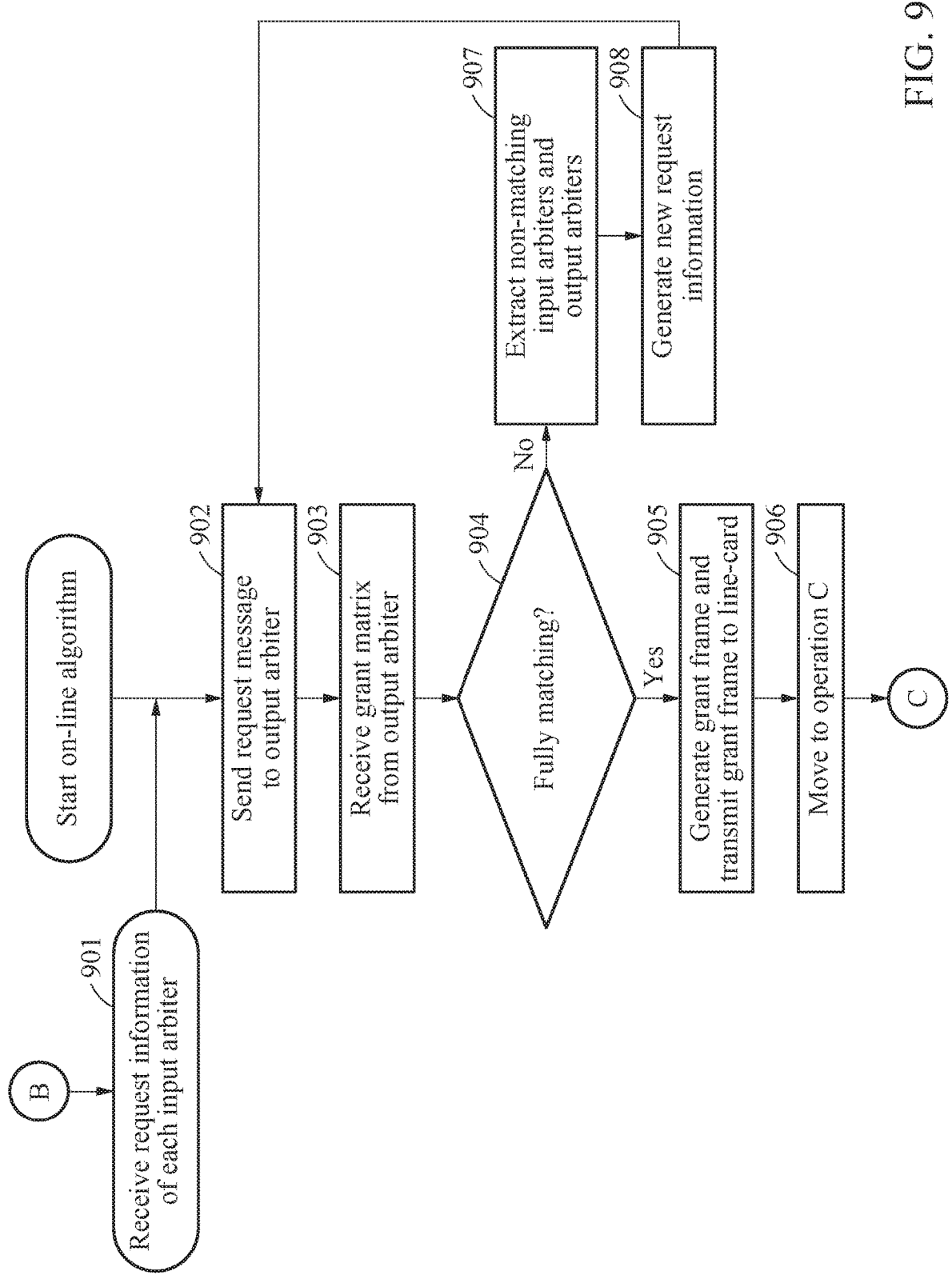
FIG. 9 is a flowchart illustrating a process of an on-line algorithm performed between an input arbiter and an output arbiter according to an example embodiment.

In operation 809, the centralized scheduling apparatus may perform operation B of FIG. 9 to perform the on-line algorithm.

In operation 803, when scheduling for a current sequence step s is completed from operation C of FIG. 9, the centralized scheduling apparatus increases the sequence step by "1", and then perform operation 804.

FIG. 9 is a flowchart illustrating a process of an on-line algorithm performed between an input arbiter and an output arbiter according to an example embodiment.

Referring to FIG. 9, a centralized scheduling apparatus shows an overall operation flowchart of an on-line algorithm according to an example embodiment, which is divided into operations of mapping input RRP sequence information and output RRP sequence information to a real-time traffic matrix.

In operation 901, the centralized scheduling apparatus may receive request information of each input arbiter (IA) from operation B of FIG. 8.

In operation 902, the centralized scheduling apparatus may send a request message to an output arbiter (OA) through each input arbiter.

In operation 903, in the centralized scheduling apparatus, each input arbiter may receive a grant Boolean matrix G' from the output arbiter according to Equation 9 of FIG. 5.

In operation 904, the centralized scheduling apparatus may verify whether input arbiters fully match output arbiters.

When it is verified in operation 904 that the input arbiters do not fully match the output arbiters, in operation 907, the centralized scheduling apparatus may extract non-matching input arbiters and output arbiters according to Equations 10 and 11 of FIG. 5.

In operation 908, the centralized scheduling apparatus may extract new request information for a next iteration i+1 from Equation 12 of FIG. 5 through operation 840, and then perform operation 902 again.

When it is verified in operation 904 that the input arbiters fully match the output arbiters, in operation 905, the centralized scheduling apparatus may generate a grant frame and transmit the grant frame to a line-card.

In operation 906, the centralized scheduling apparatus may perform operation C of FIG. 8 to perform (870) an off-line algorithm for a next sequence step s+1.

According to example embodiments, in a data center network having bursty and data-intensive traffic characteristics, a centralized scheduler may effectively schedule non-uniform traffic based on a traffic distribution in the data center network, thereby improving a network efficiency and traffic delay performance.

According to example embodiments, it is possible to improve performances for a specific hotspot condition and an average delay by considering a traffic load in a data center network and providing cyclic scheduling template-based scheduling that enables expansion of a cyclic period through scaling factor.

According to example embodiments, it is possible to perform a real-time on-line algorithm using an RRP determined based on scheduling sequence information and a non-real-time off-line algorithm that determines the scheduling sequence information based on a traffic distribution provided through traffic monitoring of a centralized cluster, thereby uniformly distributing initial pointers of an input arbiter and an output arbiter, more effectively matching the input arbiter and the output arbiter, and maximally improving a switching performance.

According to example embodiments, it is possible to achieve a performance close to at most 100% under various hotspot conditions by uniformly distributing RRPs corresponding to an early stage of an on-line algorithm and, particularly, significantly reduce an average delay difference of traffic occurring in a hotspot and a non-hotspot.

According to example embodiments, it is possible to provide a method of finding an initial pointer of an input arbiter and an output arbiter of an on-line algorithm through an off-line algorithm and mapping a non-real-time traffic matrix used in the off-line algorithm to a real-time traffic matrix used in the on-line algorithm.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A centralized scheduling method comprising:
    generating a round-robin-pointer (RRP) sequence matrix using a non-real-time traffic matrix formed through traffic monitoring;
    generating a transportation-request (TR) Boolean matrix using a real-time traffic matrix formed based on the RRP sequence matrix;
    setting a pointer of an input arbiter and a pointer of an output arbiter corresponding to the TR Boolean matrix using a round-robin scheme;
    determining, based on the pointer of the input arbiter and the pointer of the output arbiter, whether an input arbiter matches an output arbiter in accordance with a messaging cycle; and
    generating a grant frame when matching between the input arbiter and the output arbiter is completed and transmitting the generated grant fame to a plurality of line-cards.

2. The centralized scheduling method of claim 1, wherein the generating of the RRP sequence matrix comprises:
    generating a normalized traffic matrix from the non-real-time traffic matrix; and
    forming an RRP sequence matrix having a mutual pointing characteristic based on the normalized traffic matrix.

3. The centralized scheduling method of claim 2, wherein the generating of the normalized traffic matrix generates a normalized traffic matrix in which traffic throughput under a predetermined condition is adjusted by applying a scaling factor to the non-real-time traffic matrix.

4. The centralized scheduling method of claim 2, wherein the forming of the RRP sequence matrix minimizes a number of elements in a row and a column having a maximum value in the normalized traffic matrix and forms an RRP sequence matrix having a mutual pointing characteristic between an input arbiter and an output arbiter.

5. The centralized scheduling method of claim 4, wherein the forming of the RRP sequence matrix determines a row and a column having a maximum value in the normalized traffic matrix, subtracts "1" from a maximum value of elements of the determined row and column, excludes the maximum-value-subtracted row and column from the normalized traffic matrix, and minimizes a number of the elements.

6. The centralized scheduling method of claim 1, wherein the forming of the RRP sequence matrix extracts N RRP sequences for an RRP sequence length in each interval of a time slot S based on a sequence step to generate an RRP sequence matrix having a size of N*S.

7. The centralized scheduling method of claim 1, wherein the generating of the TR Boolean matrix comprises:
    generating a real-time traffic Boolean matrix indicating an availability of scheduling between an input arbiter and an output arbiter in a predetermined interval in consideration of a status of virtual output queue (VOQ);
    extracting a column vector from an RRP sequence matrix based on a sequence step;
    generating an RRP Boolean matrix based on the column vector; and
    generating a TR Boolean matrix using the real-time traffic Boolean matrix and the RRP Boolean matrix.

8. The centralized scheduling method of claim 1, wherein the determining of whether the input arbiter matches the output arbiter comprises:
    verifying whether a plurality of elements included in the TR Boolean matrix is equal to a cardinality of a set having a value not being zero;

generating, in a case of being equal, a request message of an input arbiter using a request frame transferred from N line-cards;
sending the generated request message of the input arbiter to an output arbiter;
generating a grant Boolean matrix including a grant message of an output arbiter for an input arbiter from an output arbiter receiving the request message; and
determining whether input arbiters match output arbiters using the grant Boolean matrix.

9. A centralized scheduling method comprising:
generating scheduling sequence information using a scaling factor based on a traffic load of a network through traffic monitoring by applying an off-line algorithm;
determining a pointer of an input arbiter and a pointer of an output arbiter using a round-robin-pointer (RRP) of the scheduling sequence information by applying an on-line algorithm;
generating a request message of an input arbiter for message sending to correspond to a time order of the RRP;
determining whether input arbiters match output arbiters in response to the request message; and
generating a grant frame when matching between the input arbiters and the output arbiters is completed and transmitting the generated grant frame to a plurality of line-cards.

10. The centralized scheduling method of claim 9, wherein the generating of the scheduling sequence information comprises:
setting scheduling sequence information corresponding to a time slot S repetitively performed based on a predetermined cycle;
mapping scheduling sequence information and virtual output queue (VOQ) information for each input port; and
updating an RRP of scheduling sequence information using the scheduling sequence information mapped to the VOQ information for each time slot of the time slot S.

11. The centralized scheduling method of claim 9, wherein the pointer of the input arbiter and the pointer of the output arbiter are determined based on RRP sequence information associated with an input and RRP sequence information associated with an output of the off-line algorithm.

12. The centralized scheduling method of claim 11, wherein the pointer of the input arbiter and the pointer of the output arbiter are determined to if the time slot S is 't', a column formed between each time slot S and 't' of the RRP sequence information associated with an input and the RRP sequence information associated with an output.

13. The centralized scheduling method of claim 9, wherein the determining of the pointer of the input arbiter and the pointer of the output arbiter determines a pointer of an input arbiter and a pointer of an output arbiter in consideration of N RRP sequences for an RRP sequence length in each interval of a time slot S based on a sequence step.

14. The centralized scheduling method of claim 9, wherein the generating of the request message generates a request message of an input arbiter upon every iteration of the time slot S.

15. The centralized scheduling method of claim 9, wherein the determining of whether the input arbiters match the output arbiters comprises:
sending the generated request message of the input arbiter to an output arbiter;
receiving a grant message of an output arbiter for an input arbiter from the output arbiter receiving the request message; and
determining whether input arbiters match output arbiters based on a messaging cycle including the request message and the grant message.

16. The centralized scheduling method of claim 9, wherein when the input arbiters do not match the output arbiters, the determining of whether the input arbiters match the output arbiters generates a grant message for a next iteration operation for an input arbiter and an output arbiter which are not matched.

* * * * *